(12) United States Patent
Micai et al.

(10) Patent No.: US 12,176,646 B2
(45) Date of Patent: Dec. 24, 2024

(54) THERMOSTAT SWITCH ASSEMBLY WITH THERMAL INSULATOR FOR PROTECTION AGAINST OVERHEATING

(71) Applicant: EMICOL Eletro Eletrônica S.A., Itu (BR)

(72) Inventors: José Cláudio Micai, Itu (BR); Luiz Paulo Buzzo Meza, Itu (BR); Vinícius De Oliveira, Salto (BR)

(73) Assignee: EMICOL Eletro Eletrônica S.A., Itu (BR)

( * ) Notice: Subject to any disclaimer, the term of this patent is extended or adjusted under 35 U.S.C. 154(b) by 359 days.

(21) Appl. No.: 17/634,274

(22) PCT Filed: Jun. 29, 2020

(86) PCT No.: PCT/BR2020/050230
§ 371 (c)(1),
(2) Date: Feb. 10, 2022

(87) PCT Pub. No.: WO2021/026625
PCT Pub. Date: Feb. 18, 2021

(65) Prior Publication Data
US 2022/0336990 A1 Oct. 20, 2022

(30) Foreign Application Priority Data
Aug. 13, 2019 (BR) ...................... 10 2019 016718-1

(51) Int. Cl.
*H01R 13/405* (2006.01)
*G05D 23/30* (2006.01)
(Continued)

(52) U.S. Cl.
CPC ........... *H01R 13/405* (2013.01); *G05D 23/30* (2013.01); *H01R 13/502* (2013.01); *H01R 13/6616* (2013.01)

(58) Field of Classification Search
CPC ................ H01R 13/405; H01R 13/502; H01R 13/6616; G05D 23/30
(Continued)

(56) References Cited

U.S. PATENT DOCUMENTS 3,852,695 A * 12/1974 Northrup, Jr. ......... G05D 23/30
337/40
3,921,198 A * 11/1975 Pohl ....................... H01H 37/54
337/354
(Continued)

FOREIGN PATENT DOCUMENTS

BR 8307135 A 7/1984
CH 671649 A5 9/1989
(Continued)

*Primary Examiner* — Peter G Leigh
(74) *Attorney, Agent, or Firm* — The Webb Law Firm

(57) ABSTRACT

Provided is a thermostat including a diaphragm arranged on a core body that is inserted into a base. The assembly is closed at the top by a metallic cover and at the bottom by a flat lid. The thermostat also includes the core body presenting a cylindrical shape and is provided with two radially opposing projections and a guide hole, with the guide hole centrally arranged to receive a pin in a slidably manner; and the base, in an monolithic body, including: two walls in the form of a cylindrical arc, having collars on their top portions and together defining a cradle for said core body; and sides and faces that are adjacent to the sides. Projecting from said faces are terminals for electrical connection. The short terminal is coupled to a contact blade for contact with the long terminal. The blade is actuated by the pin, which is in turn actuated by the diaphragm. The terminals and the blade are co-injected with the base. Alternatively, the thermostat also includes a heater bias, formed by a pair of resistors in parallel.

5 Claims, 2 Drawing Sheets

(51) Int. Cl.
*H01R 13/502* (2006.01)
*H01R 13/66* (2006.01)

(58) Field of Classification Search
USPC .................................................. 439/620.21
See application file for complete search history.

(56) References Cited

U.S. PATENT DOCUMENTS

| | | | | |
|---|---|---|---|---|
| 3,943,480 A | * | 3/1976 | Schmitt | H01H 37/006 337/354 |
| 4,533,894 A | | 8/1985 | Bishop et al. | |
| 4,591,820 A | * | 5/1986 | Ruszczyk | H01H 37/14 337/354 |
| 4,620,175 A | * | 10/1986 | Karr | H01H 37/5427 337/343 |
| 4,646,051 A | * | 2/1987 | Ruszczyk | H01H 37/14 337/377 |
| 4,754,251 A | * | 6/1988 | Ting | H01H 37/14 29/622 |
| 4,780,698 A | * | 10/1988 | Tomkinson | H01H 81/02 337/380 |
| 4,879,805 A | * | 11/1989 | Tomkinson | H01H 81/02 29/418 |
| 4,952,901 A | * | 8/1990 | Chrupcala | H01H 37/54 337/380 |
| 5,089,800 A | * | 2/1992 | Yang | H01H 37/54 337/380 |
| 5,576,683 A | * | 11/1996 | Rose | H01H 37/14 337/333 |
| 5,929,742 A | * | 7/1999 | Short | H01H 37/5409 337/365 |
| 6,597,274 B1 | * | 7/2003 | Nguyen | H01H 37/14 337/380 |
| 6,833,782 B2 | * | 12/2004 | Nguyen | H01H 37/14 337/380 |
| 7,218,200 B2 | * | 5/2007 | Hayashi | H01H 37/5409 337/333 |
| 2006/0082432 A1 | * | 4/2006 | Hayashi | H01H 37/5409 337/333 |
| 2013/0106563 A1 | * | 5/2013 | Yang | H01H 9/10 337/143 |
| 2015/0206680 A1 | * | 7/2015 | Yang | H01H 37/002 337/298 |
| 2016/0155588 A1 | * | 6/2016 | Yang | H01H 37/48 337/397 |

FOREIGN PATENT DOCUMENTS

| | | | | |
|---|---|---|---|---|
| CN | 201282080 Y | * | 7/2009 | |
| CN | 201812747 U | * | 4/2011 | |
| CN | 104325595 A | * | 2/2015 | |
| CN | 105719904 A | * | 6/2016 | |
| CN | 106014593 A | | 10/2016 | |
| CN | 105455664 B | * | 1/2019 | ............ A47J 27/00 |
| JP | 2005353390 A | * | 12/2005 | ........ H01H 37/5409 |
| KR | 100661496 B1 | | 12/2006 | |
| MU | 8900094-3 U2 | | 9/2009 | |

\* cited by examiner

THERMOSTAT SWITCH ASSEMBLY WITH THERMAL INSULATOR FOR PROTECTION AGAINST OVERHEATING

CROSS-REFERENCE TO RELATED APPLICATIONS

This application is the United States national phase of International Application No. PCT/BR2020/050230 filed Jun. 29, 2020, and claims priority to Brazilian Patent Application No. BR 10 2019 016718-1 filed Aug. 13, 2019, the disclosures of which are hereby incorporated by reference in their entirety.

BACKGROUND OF THE INVENTION

Field of the Invention

The present invention relates to an improved thermostat and, in particular, to a thermostat whose structure comprises a co-injected base and a core body inserted therein. Such configuration allows for a more agile and automated assembling, further enhancing the thermostat functional and operational features.

Description of Related Art

It is already known to the art the thermostats whose body is formed from the coupling of one or more parts, such as it is taught in the patent application CN 106014593, complemented by application CN 104325595. In this disclosed solution, the thermostat comprises a base on which a shell-like element formed by two separate parts is coupled to, and said parts being formed from injection molding with composite material.

Document MU 8900094 teaches a bimetallic thermostat that comprises a cobblestone shape body from which a structure for attaching the sensitive thermostatic element is projected. The inner side of said body further comprises a circuit that defines the power relay that is characteristic of this solution. Finally, document PI 8307135 illustrates a thermostat whose main feature is the reduced number of parts. Said thermostat comprises a housing that encloses the metallic blades and the entire support structure of said blades, besides the terminals and a gas containing tube, and that is connected to a diaphragm, and that transmits the detected temperature to the diaphragm.

It is also known to the art the technique of including inside the thermostat one or more heat transmitting elements, usually resistors, in such a way as to alter the response range of the detected temperature. Such device is known to the art as "heater bias". Through this technique, said resistors are externally fed, thereby supplying a pre-determined amount of heat to the bimetallic thermostat, thus reducing its activation temperature. Examples of devices that incorporate said solution can be found in U.S. Pat. Nos. 5,576,683, 4,754,251, 4,533,894 and CH671649, which refer to thermostats having similar function features to the one disclosed in the present invention. Document KR 100661496 B1 illustrates a thermostat comprising a diaphragm, a pin, a heater bias besides the electrodes and respective terminals. The object aimed in this document is to improve the mounting of the thermostat by restructuring the connection between the resistance material and the terminal, but this solution does not anticipate separating the base in two parts in order to facilitate the automated mounting of the thermostat.

Document CN105719904 teaches a compactly-assembled temperature controller comprising a shell, two electrical connection terminals that are arranged on a base plate of the shell, a thermosensitive sheet and an actuating mechanism that are arranged in the shell, the actuating mechanism comprising a support, the thermosensitive sheet is transversely and fixedly arranged at the upper end of the support and props against the temperature sensing cover in a matching way, a movable plunger is vertically arranged on the support, an elastic shift fork is arranged on the support, a fixed end of the elastic shift fork is connected with the support in a matching way, the elastic shift fork and the lower end of the plunger are arranged in an integrated linkage way, an actuating arm is arranged on a movable end of the elastic shift fork, and the two ends of the actuating arm are electrically connected with the two electrical connection terminals in a pair way. However, the shell structure is not appropriated for an easy and fast assembling of the temperature controller.

U.S. Pat. No. 6,597,274 B1 discloses an adjustable bimetal snap disc thermostat which provides conventional resistance-type heaters symmetrically positioned adjacent to one side of the snap disc to allow adjustment of the operating temperature of the thermostat. The heaters are supported in accurate, very close proximity to the bimetal snap disc to ensure excellent heat transfer thereto. Additionally, the volume of the chamber within which the heaters are supported is reduced by a bridge portion which also serves to further reinforce the outer housing walls. Additionally, guide surfaces for the heater terminals are provided to facilitate assembly.

Nowadays, the industry's demands regarding the manufacture of said thermostats have become increasingly stricter when it comes to quality and time, resulting as a whole in better quality and more economically accessible products.

Therefore, and aiming to meet such current demands, the inventors were able to reconfigure the thermostats in a way to enable a more agile manufacturing and to render a component that is structurally more solid and less prone to failures from the operational point of view.

SUMMARY OF THE INVENTION

For that end, the present invention comprises a thermostat whose body is formed by a base that is co-injected together with the terminals and with the contact blade in order to guarantee a precise positioning that is not likely to be altered due to its continuous use. Moreover, projecting from said base is a pair of walls that form an arc-like structure, which define a cradle for receiving a core body, inside of which there is a movable pin and that interconnects, mechanically, a diaphragm and said contact blade. The assembly is closed on top by a metallic cover and on the bottom by a flat lid, wherein said metallic cover is destined to stay in touch with the environment whose temperature must be monitored.

More specifically, the present invention comprises a thermostat composed of a diaphragm placed on a core body, which is inserted on a base, said assembly being closed on top by a metallic cover and on the bottom by a flat lid. Said core body being of a cylindrical shape and presenting two projections located in opposite directions and a guide hole centrally positioned to receive a pin in a slidably manner; and said base, in a monolithic body, comprising: two walls forming a cylindrical arc, having collars on their top portion and defining, all together, a cradle-like support for said core body; and sides and faces, adjacent to said sides, wherein electric connection terminals project from said faces, and wherein the short terminal is coupled to a blade contacting the long terminal, said blade being actuated by the pin that, in its turn, is actuated by the diaphragm; and wherein the terminals and the blade are co-injected with the base.

Alternatively, said thermostat comprises a heater bias that is formed by a pair of parallel resistors, placed below the diaphragm and fixed to the respective terminals of the heater bias, wherein said terminals of the heater bias run through the core body, the base and the lid, projecting themselves from the bottom portion of the thermostat.

Furthermore, the thermostat is co-injected, in a respective injection mold, together with the terminals and the blade, wherein said terminals may be inserted into the injection mold fixed to a support tape, or wherein said terminals may be individually inserted into the injection mold.

BRIEF DESCRIPTION OF THE DRAWINGS

The invention will be better understood from the following detailed description of a preferred embodiment of the invention, which is illustratively supported by the hereunder described figures given purely by way of a non-limiting example of the invention, wherein.

DESCRIPTION OF THE INVENTION

Figure 1:
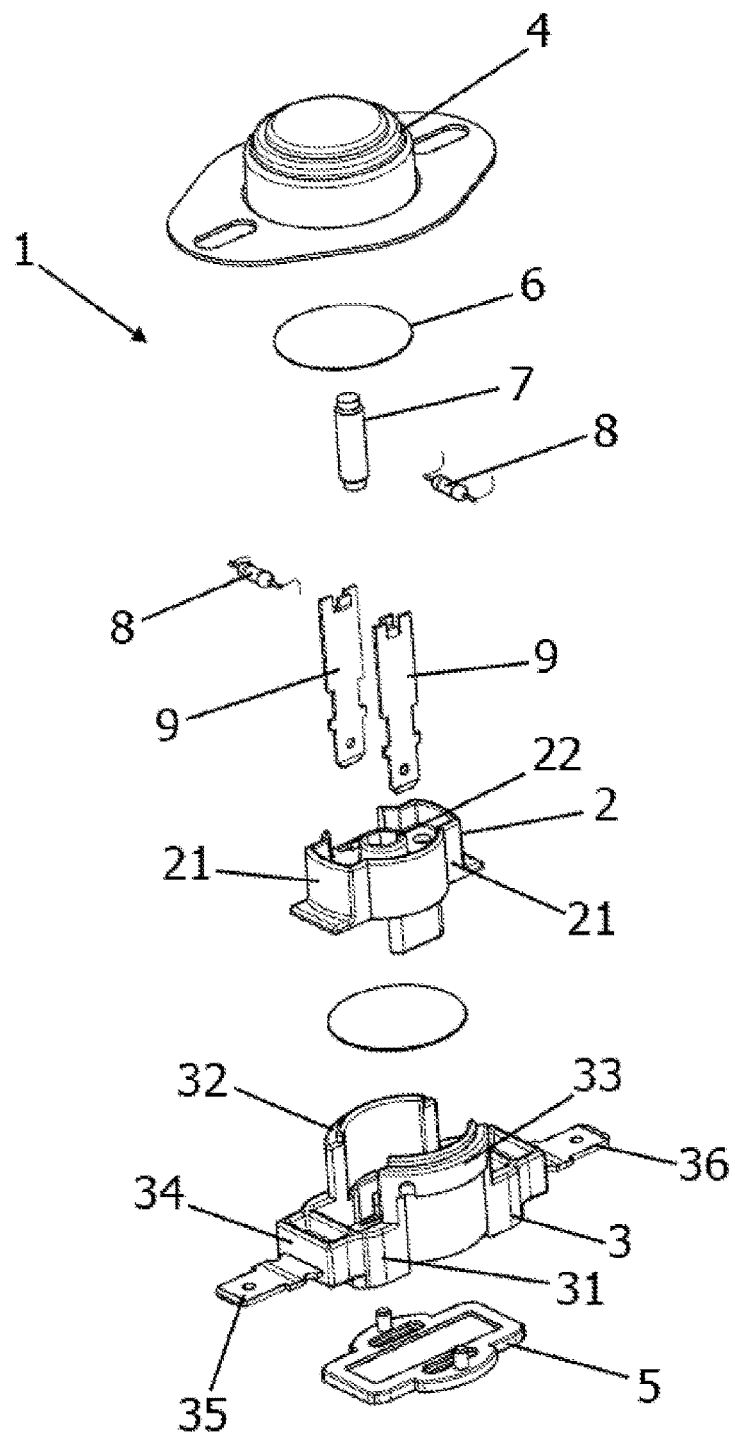
FIG. 1 is an exploded perspective view of the components of the invention's thermostat.
Figure 2:
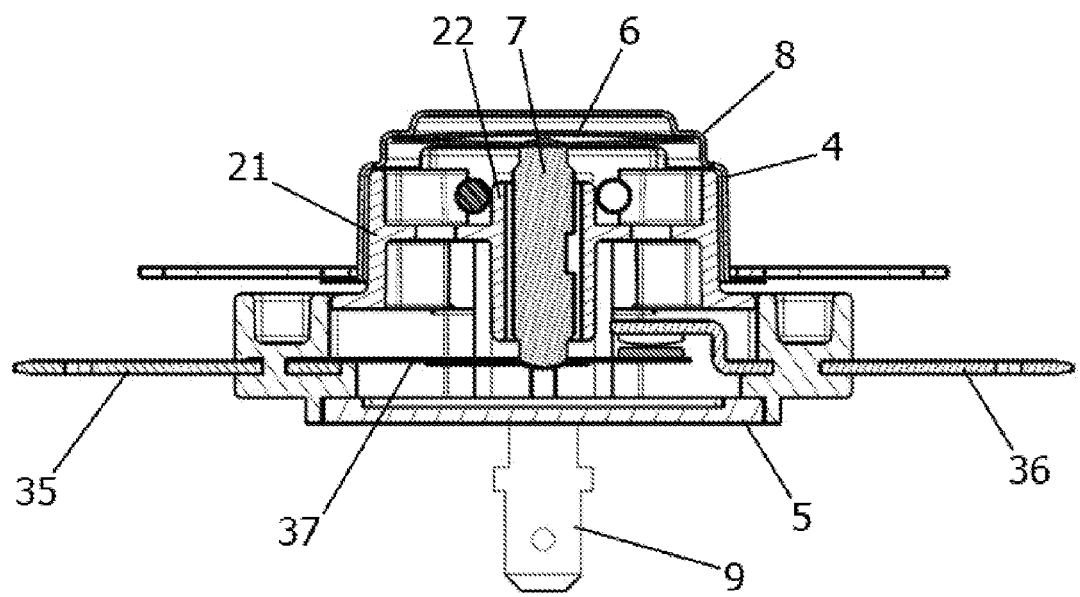
FIG. 2 is a cross-section view of the invention's thermostat in the assembled conditions.

In accordance with the above-mentioned figures, the reference number 1 generically illustrates a thermostat according to the invention. Said thermostat is basically composed of a nuclear body 2, which is inserted in a base 3, said assembly being closed on top with a metallic cover 4 and on the bottom by a lid 5.

As regards specifically the base 3, it has the shape of a basically rectangular monolithic body, with the projecting sides 31. Further, projecting from said base 3 in an upwards longitudinal direction there are two walls 32 forming a cylindrical arc that together define a cradle-like support for receiving said nuclear body 2. Furthermore, said walls 32 have respective collars 33 forming an integral part with said walls, which serve to attach the metallic cover 4, as it will be seen hereunder.

Regarding the faces 34, adjacent to said side 31, they are flat and projecting therefrom are the terminals 35, 36 for the electronic connection with the circuit and/or device on which the present thermostat is employed. Further, and as it is known in the art, the short terminal 35 is coupled to a contact blade 37, usually manufactured in a metallic material that is different from the metallic material of the terminals 35, 36. Said blade 37 is intended to be mechanically displaced under the action of the diaphragm 6 and pin 7, resting in an electric contact position (non-acting diaphragm) in relation to the long terminal 36, and in an electric interruption position when the diaphragm acts on the blade 37. Alternatively, a terminal 36 can be formed in a such a way to reverse the actuation mode of the thermostat, that is, remaining in an interruption position, and switching to a contact condition, or conduction, when the diaphragm moves from its resting position to an actuation position upon detecting a given temperature in the region adjacent to the metallic cover 4.

In accordance with one of the features of the invention, the base 3 is co-injected together with the terminals 35, 36 and the blade 37. In practice, the co-injection process provides a mold with the appropriate shape to define the monolithic structures of the base 2, besides the specific access points for the precise positioning of each one of said terminals 35, 36, as well as the blade 37. More specifically, said terminal are inserted in the mold in a "pinned" manner, i.e., still fixed to a support tape (formed together with the terminals), or are also individually inserted in the mold (manually).

Advantageously, co-injecting the terminals and the blade help avoid those operations conducted in the art of riveting the terminals in the base, as well as riveting the blade 37 in the short terminal 35, thereby avoiding that eventual non precise relative positionings may lead to the disposal of a manufactured part. Furthermore, and as the merger region between the blade 37 and the short terminal 35 rests inside the base 3, any possibility of an undue displacement between them is suppressed, even if the thermostat is subjected to any accidental external mechanical action (fall, crash, etc.)

As mentioned before, the base 3 is intended to receive a core body 2. Said core body 2 is a generally cylindrical structure that is provided with two radially opposed projections 21 intended to couple the hollowed areas defined by the walls 32 of the base 3. Such configuration enables a precise coupling and without the chance of relative displacements between the core body 2 and the base 3, enhancing the use and, mainly, facilitating the automatic assembly operation of the thermostat 1.

Additionally, the core body 2 further presents a guide hole 22, centrally disposed and intended to receive the pin 7 in a slidably manner.

Finally, and alternatively, the thermostat 1, according to the invention, further comprises a heater bias, formed by a pair of resistors 8, placed below the diaphragm 6. In particular, the two resistors 8 are fixed to respective terminals of the heater bias 9 so that once the terminals 9 are powered, the resistors are powered in parallel. Obviously, as known to those skilled in the art, the activation of the heater bias is determined by the system in which the thermostat is inserted, when necessary.

As a result from the configuration above described, the assembly operation of the thermostat 1 becomes easy and practical, especially if automated.

Thus, and firstly, it is carried out the co-injection of base 3 together with the terminals 35, 36 and the blade 37, in an appropriate mold that also has specific entries for the positioning of said terminals and the blade, which are fed while still attached to a support tape (not shown), or pinned, as it is usually defined in the art. The co-injection techniques with pinned elements are known to those with skill in the art, reason why further detailing in this matter is not necessary.

Next, the assembly of the other components is carried out, namely, the core body (pre-injected separately), the pin 7, the flat lid 5 and the diaphragm 6. In the alternative embodiment where the thermostat 1 includes a heater bias, the thermostat is mounted in this step, by means of penetrating its terminals 9 through the core body 2 and flat lid 5 in such a way to project from said lid. Once all the thermostat's 1 elements are in place, the metallic cover 4 is mounted in position and fastened around the walls 32 and of the base 3, and in particular in such a way that the fastening embraces the collar 33 impeding the removal of said metallic cover 4.

The invention claimed is:

1. A thermostat assembly, comprising a diaphragm placed on a core body, which is inserted in a base, said assembly being closed on top by a metallic cover and in the bottom by a flat lid, wherein:

said core body has a cylindrical shape and two projections radially opposite to one another and a guide hole, centrally arranged to receive a pin in a slidably manner, the two projections disposed in a short terminal-long terminal direction; and said base, in a monolithic body, comprising: two walls in the form of a cylindrical arc having collars on their top portions and together defining a cradle for said core body, the two walls disposed transversely to the short terminal-long terminal direction; and sides and faces, adjacent to said sides, wherein projecting from said faces are terminals for electrical connection, wherein the short terminal is coupled to a blade for contact with the long terminal, said blade being actuated by the pin which, in turn, is actuated by the diaphragm; and wherein the terminals and the blade are co-injected with the base.

2. The thermostat assembly according to claim 1, wherein the thermostat assembly comprises, alternatively, a heater bias, formed by a pair of parallel resistors, placed below the diaphragm and fixed to respective terminals of the heater bias, wherein said terminals of the heater bias run through the core body, the base and the flat lid, projecting downwards of the thermostat assembly.

3. The thermostat assembly according to claim 1, wherein the base is co-injected, in a respective injection mold, together with the terminals and with the blade.

4. The thermostat assembly according to claim 3, wherein said terminals are inserted into the injection mold fixed on a support tape.

5. The thermostat assembly according to claim 3, wherein said terminals are individually inserted into the injection mold.

* * * * *